United States Patent [19]

Whisenhunt

[11] 4,283,025

[45] Aug. 11, 1981

[54] MOTORIZED ATTACHMENT FOR A FISHING REEL

[76] Inventor: Kelsie C. Whisenhunt, 72 Coleman St., Edgewater, Fla. 32032

[21] Appl. No.: 104,534

[22] Filed: Dec. 17, 1979

[51] Int. Cl.³ .......................................... A01K 89/0.017
[52] U.S. Cl. .................................... 242/84.1 A; 43/21
[58] Field of Search ..................... 242/84.1 A, 84.1 R, 242/84.1 K, 84.3; 43/21; 254/316

[56] References Cited

U.S. PATENT DOCUMENTS

| D. 254,682 | 4/1980 | Whisenhunt | D22/25 |
|---|---|---|---|
| 2,190,398 | 2/1940 | Bugatti | 43/21 |
| 2,615,352 | 10/1952 | Mies et al. | 242/84.1 K |
| 3,077,318 | 2/1963 | DuVal | 242/84.1 A |
| 3,669,378 | 6/1972 | Miyamae | 242/84.1 A |

*Primary Examiner*—Billy S. Taylor
*Attorney, Agent, or Firm*—Bacon & Thomas

[57] ABSTRACT

An adaptor arrangement that can be attached to many of the popular makes of "Deep Sea" fishing reels. The adaptor includes an electric motor with a convenient thumb operated switch and can be easily attached to the side member of a conventional fishing reel with no machine work necessary. When attached, the adaptor will provide power to the reel in the same manner as the hand crank.

5 Claims, 6 Drawing Figures

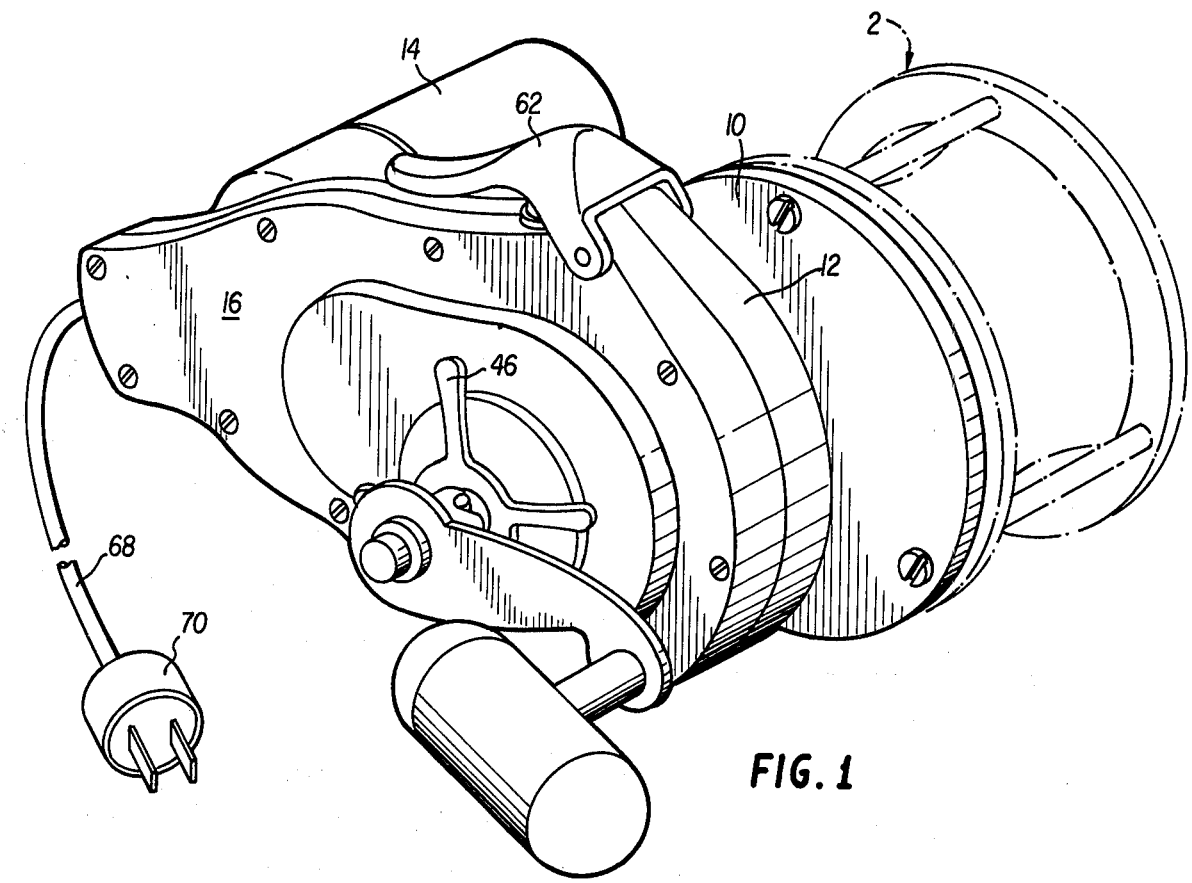
FIG. 1
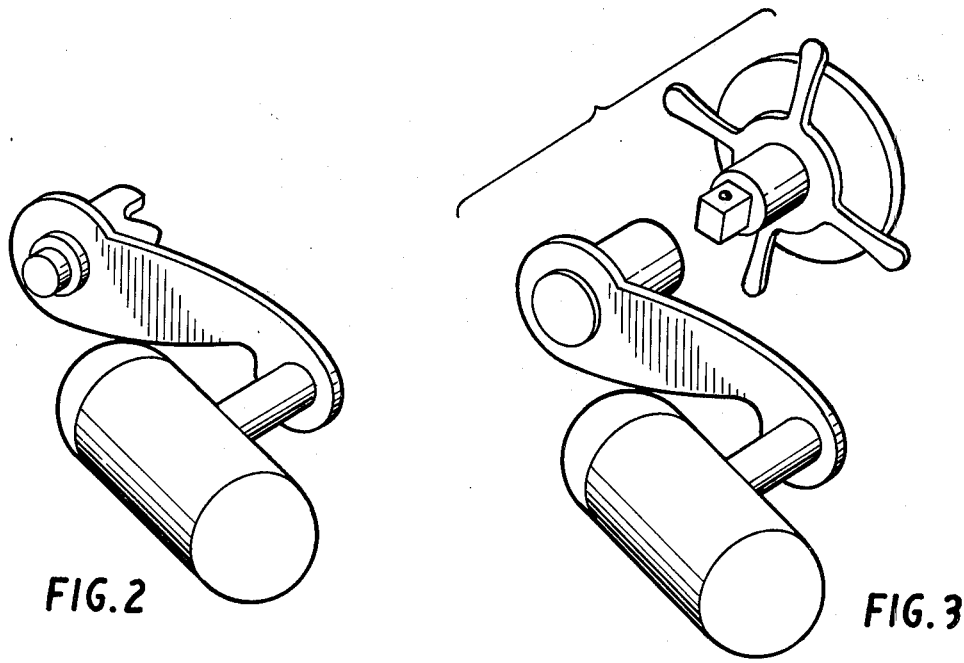
FIG. 2
FIG. 3

MOTORIZED ATTACHMENT FOR A FISHING REEL

BACKGROUND OF THE INVENTION

This invention is in the field of fishing reels and relates particularly attachments for motorizing conventional fishing reels to be motor driven.

It has long been proposed to provide motorized fishing reels, but such were normally constructed to be motor driven in the first instance. It has also been proposed to provide separate motors adapted to engage the hand crank of a conventional fishing reel for operating the same by power, see, for example, U.S. Pat. Nos. 3,077,318 and 3,126,166. Those patents, however, disclose conventional fishing reels with a separate motor adapted to be brought into proximity to the hand crank to effect rotation of the crank. However, such devices were inconvenient and difficult to operate satisfactorily, and no provision was made for providing motorized drive while, at the same time, permitting adjustment of the "drag" of the reel.

SUMMARY OF THE INVENTION

The present invention comprises an attachment for a conventional reel that may be mounted thereon, and left on the reel permanently. The attachment includes an electric motor, driving through a one-way clutch to the shaft of the reel from which the crank handle has been removed. Also, the attachment includes a sleeve surrounding the shaft and having means accessible from the outside of the attachment for adjusting the drag of the reel, and for mounting the crank handle, whereby the reel may be operated selectively either by motor or by hand crank.

BRIEF DESCRIPTION OF THE DRAWINGS

FIG. 1 is a perspective view showing the motorized adaptor with a typical fishing reel mounted in place;

FIG. 2 shows one method of mounting the hand crank on the attachment;

FIG. 3 is a partial view showing parts of the adaptor and an optional method of applying or removing the hand crank;

DESCRIPTION OF THE PREFERRED EMBODIMENT

Figure 6:
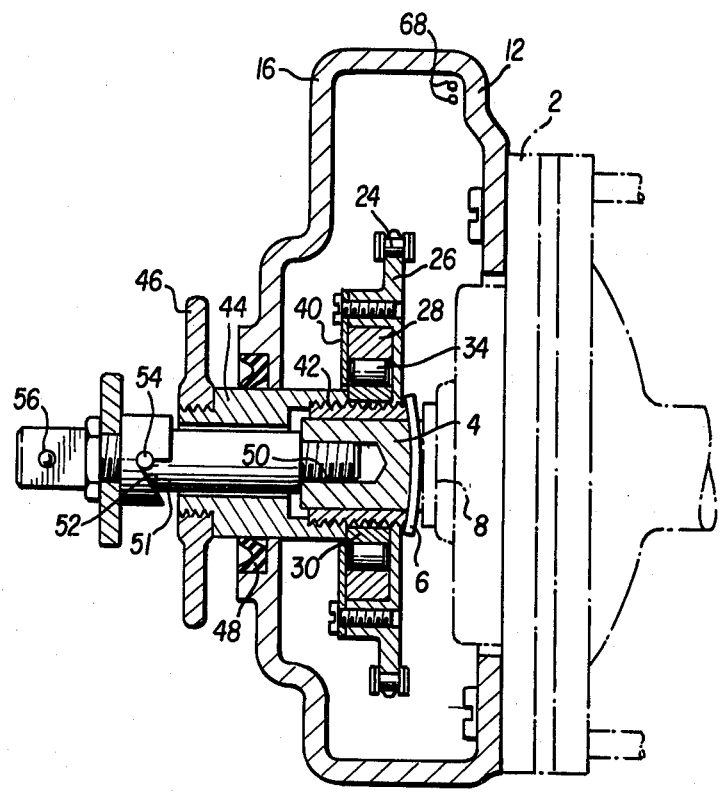
FIG. 6 is a sectional view taken along the line 6—6 of FIG. 5, but also including the casing.

FIGS. 1 and 6 show, by broken line, portions of a conventional reel for which the present attachment is intended. Particularly, FIG. 6 shows the frame 2 of the conventional reel having a threaded reel driving shaft 4 having flattened opposed sides, as will be described later. The conventional reel also includes a spring member 6 that can be flexed to apply pressure to a drag-adjusting mechanism 8. The drag-adjusting mechanism is conventional and will not be further described herein.

In the original reel, a handle was attached to shaft 4 and a sleeve surrounding the shaft threadedly engaged with the same to apply pressure to the spring 6 to thus adjust the drag mechanism. As shown in FIG. 6, the handle and drag-adjusting means have been removed for purpose of attaching the present attachment.

Referring now to FIG. 1, the attachment of the present invention comprises a plate 10 adapted to be screwed to the frame of the reel 2 and includes a casing portion 12 and an electric motor 14. A cover plate 16 covers the outer face of the attachment and may be removed therefrom to expose the driving mechanism shown in greater detail in FIG. 4.

Figure 4:
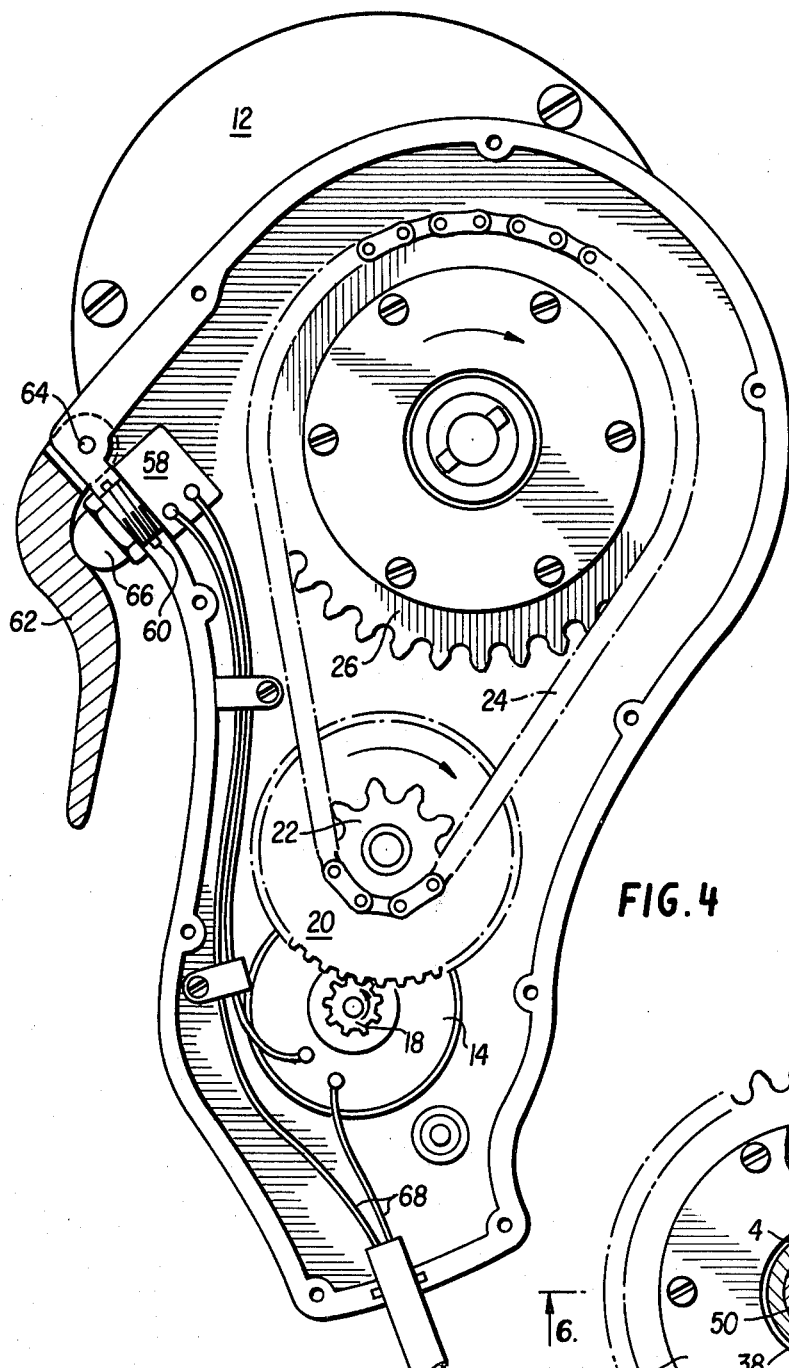
FIG. 4 is a view of the attachment with its cover plate removed.
Figure 5:
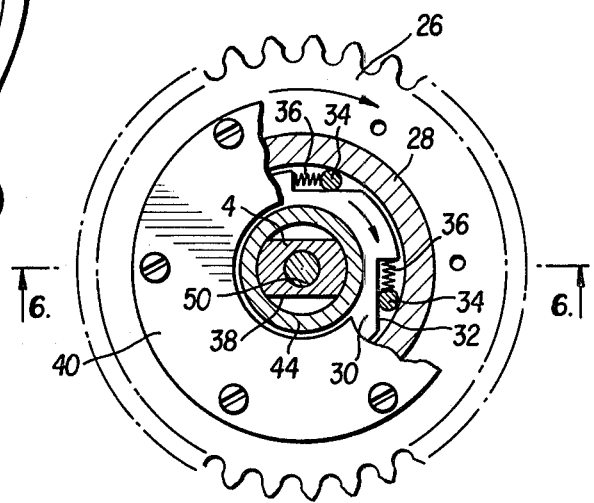
FIG. 5 is a partially cutaway view of the main drive sprocket showing the over-running clutch in detail.

In FIG. 4, the motor 14 has a driving shaft provided with a pinion 18 meshing with a gear 20 mounted on a shaft and carrying a small sprocket wheel 22. A sprocket chain 24 extends around the sprocket wheel 22 and around a larger sprocket wheel 26 constituting a portion of a one-way clutch. The one-way clutch is shown in greater detail in FIG. 5, wherein the clutch is shown as comprising an outer race portion 28 (part of sprocket wheel 26) and a separate inner hub portion 30. The inner hub portion is provided with cam cutouts 32 in which sprag rollers 34 are positioned. This is a more-or-less conventional one-way clutch mechanism and includes springs 36 to urge the rollers 34 into wedging or camming engagement between the hub 30 and outer race 28. At its center, the hub 30 is provided with an opening corresponding to the shape of the reel shaft 4. That is, the opening is of the shape shown at 38 in FIG. 5. The shaft 4 is essentially a cylindrical shaft threaded on its outer surface with opposed flat surfaces giving it a non-circular outline in the region extending outwardly from the reel frames. Thus, the cam hub 30 is slidable on the shaft 4, but is non-rotatable thereon. The motor 14 may drive the reel in one direction, but the reel is free to rotate in the same direction faster than the motor drive, so that the fishing line may be drawn therefrom. Also, the shaft may be rotated by other means, to be described, and "overrun" the motor drive if necessary.

Referring now more particularly to FIG. 6, the casing 12 of the attachment may be secured directly to the frame of the reel 2 in the manner shown, and the cover plate 16 secured thereover to enclose the drive mechanism. As shown in FIG. 6, the rollers 34 are retained between the hub 30 and the outer race 28 by means of a cover plate 40 extending over the cutouts 32 and secured to the outer race or sprocket wheel 26. With the attachment mounted as shown in FIG. 6, the hub 30 is freely slidable along the driving shaft 4, but is non-rotatable with respect thereto. The outer surface of the shaft 4 is threaded, as shown at 42, and receives sleeve 44 threadedly mounted thereon and threaded sufficiently far so that the end of the sleeve can abut the hub 30. The sleeve 44 extends outwardly through the cover 16 of the casing and has the star wheel 46 mounted thereon, which star wheel was originally on the reel before the attachment was mounted. A resilient seal 48 is provided between the sleeve 44 and the casing cover 16 to exclude water and dirt. The reel driving shaft 4 was initially provided with a socket 50 internally threaded, to receive a holding screw for the crank. An extension shaft extension 51 is provided with means for mounting the crank handle taken from the original reel and which was mounted on the shaft 4. As shown in FIG. 6, the crank handle is provided with a hook-shaped recess 52 engageable with a pin 54 on the shaft extension 51 to constitute a one-way drive through extension shaft 51 to the reel 2. The outer end of the shaft 51 may also be provided with a spring-pressed ball detent 56 to prevent inadvertent removal of the crank handle. As shown in the drawings, the end of the shaft extension 50 may be of square configuration if necessary to accommodate the crank handle originally on the reel.

As best shown in FIG. 4, a motor control switch 58 is mounted on the casing wall and extends therethrough. A resilient seal 60 in the form of an O-ring is mounted between the switch 58 and the casing wall to provide a seal against moisture. A lever 62 is pivoted to the casing 12 at 64 and bears against the actuating member 66 of the motor control switch to operate the same. The control lever 62 is so shaped as to be conveniently manipulated by the thumb or finger of the user. Electrical conductors 68 are connected to the switch 58 and motor 14, and lead to a plug 70 adapted to be inserted in any suitable receptacle providing the proper electrical power.

It will be apparent with the attachment secured to the reel in the manner described above, the motor may be employed to drive the reel in a forward direction through the one-way clutch and yet the line can be withdrawn from the reel by rotating the same in a forward direction faster than the motor would be driving same, since the over-running clutch permits such an operation. Also, even with the motor stopped, the hand crank may be rotated to drive the reel in a forward direction without applying torque to the motor 14.

While a single specific embodiment of the invention has been shown and described herein, the same is merely illustrative of the principles involved and other forms may be adopted within the scope of the appended claims.

We claim:

1. A motorizing attachment for a fishing reel having a frame, a threaded driving shaft with a removable crank handle thereon and a removable drag adjusting member surrounding said shaft, said attachment comprising:
   a casing having a motor therein and a drive means including a one-way drive device having a driven hub adapted to be non-rotatable, but slidably mounted on said driving shaft and in engagement with a portion of the drag adjusting means of said reel;
   a shaft extension adapted to be secured to the end of said driving shaft, extending through said casing, and having means for mounting said crank handle outwardly of said casing;
   a drag adjusting sleeve, threaded on said shaft and extending outwardly of said casing, with a manually operable star wheel on the outer end thereof between said casing and said means for mounting said crank handle, said sleeve surrounding said shaft extension and threadably engaging said shaft whereby it may selectively force said hub against said drag adjusting means of said reel.

2. A motorized attachment for a fishing reel having a frame including a removable member, a reel driving shaft with a removable crank handle thereon and a drag adjusting means surrounding said shaft, said attachment comprising:
   a casing adapted to be secured to said reel frame when said handle and said removable member are removed from said reel, said casing having a motor therein and a drive train including a one-way drive adapted to be connected to said reel driving shaft;
   a shaft extension in said casing adapted to be attached to said reel driving shaft and having means for mounting said crank handle thereon, outwardly of said casing; and
   means in said casing for selectively actuating said drag adjusting means of said reel and including a manually operable member adjacent the outer end of said shaft extension.

3. A motorized attachment for a fishing reel as defined in claim 1 wherein said sleeve extends through an outer wall of said casing and resilient sealing means between said sleeve and said casing wall.

4. An attachment as defined in claim 1 wherein said motor is an electric motor, a motor control switch extending through said casing, sealing means between said casing and switch, and a switch actuating lever on said casing.

5. An attachment as defined in claim 1 wherein said driving shaft is cylindrical with opposed flat surfaces formed on a portion thereon, said hub having a central opening therethrough corresponding in outline to said portion of said driving shaft.

* * * * *